United States Patent
Kim et al.

(10) Patent No.: US 9,509,425 B2
(45) Date of Patent: Nov. 29, 2016

(54) SIGNAL DETECTION METHOD AND APPARATUS

(71) Applicant: Samsung Electronics Co., Ltd., Suwon-si, Gyeonggi-do (KR)

(72) Inventors: Taeyoon Kim, Seongnam-si (KR); Mingoo Kim, Hwaseong-si (KR); Jonghan Lim, Seoul (KR); Chaeman Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/192,031

(22) Filed: Feb. 27, 2014

(65) Prior Publication Data

US 2014/0242977 A1   Aug. 28, 2014

(30) Foreign Application Priority Data

Feb. 28, 2013 (KR) .................. 10-2013-0022342

(51) Int. Cl.
*H04J 11/00* (2006.01)
*H04L 27/26* (2006.01)
*H04L 25/03* (2006.01)

(52) U.S. Cl.
CPC ...... *H04J 11/0056* (2013.01); *H04L 25/03891* (2013.01); *H04L 27/2613* (2013.01)

(58) Field of Classification Search
CPC ............... H04W 24/10; H04W 24/00; H04W 36/0083; H04W 56/00; H04W 36/30; H04W 24/02; H04W 24/08; H04W 88/02; H04B 1/7156; H04B 17/005; H04L 27/28
See application file for complete search history.

(56) References Cited

U.S. PATENT DOCUMENTS

| | | | |
|---|---|---|---|
| 5,799,004 A | 8/1998 | Keskitalo et al. | |
| 2005/0259721 A1 | 11/2005 | Kawamoto et al. | |
| 2009/0137239 A1 | 5/2009 | Habendorf et al. | |
| 2010/0002643 A1 | 1/2010 | Han et al. | |
| 2010/0254471 A1 | 10/2010 | Ko et al. | |
| 2011/0002285 A1 | 1/2011 | Kim et al. | |
| 2011/0235598 A1 | 9/2011 | Hilborn | |
| 2012/0172041 A1* | 7/2012 | Krishnamurthy | H04J 11/005 455/436 |
| 2012/0275550 A1 | 11/2012 | Baek et al. | |
| 2012/0327795 A1* | 12/2012 | Mallik | H04B 17/345 370/252 |
| 2014/0357255 A1* | 12/2014 | Jonsson | H04W 52/16 455/422.1 |

FOREIGN PATENT DOCUMENTS

| | | |
|---|---|---|
| CN | 101056119 A | 10/2007 |
| CN | 101056120 A | 10/2007 |
| CN | 101491130 A | 7/2009 |
| WO | 2012-177266 A1 | 12/2012 |

OTHER PUBLICATIONS

Myung-Jin Chung et al., 'An Enhanced AGC Structure and P-SCH Detection Method for Initial Cell Search in 3GPP LTE FDD/TDD Dual Mode Downlink Mar. 2010 Receiver', Mar. 2010.

* cited by examiner

*Primary Examiner* — Anthony Addy
*Assistant Examiner* — Martin Chang
(74) *Attorney, Agent, or Firm* — Jefferson IP Law, LLP

(57) ABSTRACT

A method and an apparatus for detecting signals in a cellular system are provided. The method includes estimating power of a dominant interference cell and detecting a signal by reducing a detection performance degradation caused by an interference signal of the dominant interference cell. The dominant interference cell includes a cell, other than a serving cell, causing an interference.

16 Claims, 7 Drawing Sheets

SIGNAL DETECTION METHOD AND APPARATUS

CROSS-REFERENCE TO RELATED APPLICATION(S)

This application claims the benefit under 35 U.S.C. §119(a) of a Korean patent application filed on Feb. 28, 2013 in the Korean Intellectual Property Office and assigned Serial number 10-2013-0022342, the entire disclosure of which is hereby incorporated by reference.

TECHNICAL FIELD

The present disclosure relates to a signal detection method and apparatus. More particularly, the present disclosure relates to a method and apparatus for detecting signals in a cellular system.

BACKGROUND

The present disclosure is applicable to Orthogonal Frequency Division Multiple Access (OFDMA) system such as 3$^{rd}$ Generation Partnership Project Long Term Evolution (3GPP LTE) and other similar systems.

The OFDMA systems such as 3GPP LTE optimize the system throughput by adjusting the transmit powers of a Reference Signal (RS) for channel estimation and data signal per user (or User Equipment (UE)).

In the legacy OFDMA-based system such as 3GPP LTE, the UE needs the channel information for data demodulation. Accordingly, the base station transmits the pilot signals, which are mapped to the Resource Element (RE) close to REs to which the data signals are mapped. The pilot signal is the signal known to the UE for use in the UE's channel estimation. The pilot signal is also referred to as the reference signal.

FIG. 1 is a diagram illustrating a configuration of transmit powers of the pilot and data signals according to the related art.

Referring to FIG. 1, the transmit powers of the data signal ($P_{data}$) and the pilot signal ($P_{pilot}$) may differ from each other in level.

The UE demodulates a data signal using a channel estimated based on the pilot signal. For correct demodulation, the UE must acquire the information on the transmit powers on the pilot and data signals. Accordingly, the base station sends the UE the information on the pilot and data signal transmit powers. For example, the base station may send the UE a power ratio between the RE to which the pilot signal for channel estimation is mapped and the RE to which the data signal is mapped, i.e., power ratio information.

This is the method adapted to the 3GPP LTE in which the UE receives the information on the transmit power ratio between the RE for data signal transmission and the RE for pilot signal transmission.

FIG. 2 is a diagram illustrating the power ratio information transmission of the base station according to the related art.

Referring to FIG. 2, according to the LTE standard, the ratio between the transmit power at the Physical Downlink Shared Channel (PDSCH) RE and the transmit power at the Cell-specific Reference Signal (CRS) RE in the OFDM symbol carrying no CRS is defined as $\rho_A$. Likewise, the ratio between the transmit power at the PDSCH RE and the transmit power at the CRS RE in the OFDM symbol carrying CRS is defined as $\rho_B$. As shown in FIG. 2, the base station sends the UE the radio between $\rho_A$ and $\rho_B$ as a cell-specific value and a parameter for use in determining $\rho_A$ as a user-specific value. In the LTE system, the base station provides the UE with the power ratio information between the pilot and data signals, and the UE is capable of acquiring the information on the transmit powers of the CRS and data signals for use in data modulation. The base station transmits data and RS signals that are adjusted according to the power ratio information provided to the UE.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an efficient signal detection method and apparatus.

In accordance with an aspect of the present disclosure, a signal detection method is provided. The method includes estimating power of a dominant interference cell and detecting a signal by reducing a detection performance degradation caused by an interference signal of the dominant interference cell. The dominant interference cell includes a cell, other than a serving cell, causing a greatest interference.

In accordance with another aspect of the present disclosure, a signal detection apparatus is provided. The apparatus includes a control unit configured to estimate power of a dominant interference cell and to detect a signal by reducing a detection performance degradation caused by an interference signal of the dominant interference cell. The dominant interference cell includes a cell, other than a serving cell, causing a greatest interference.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
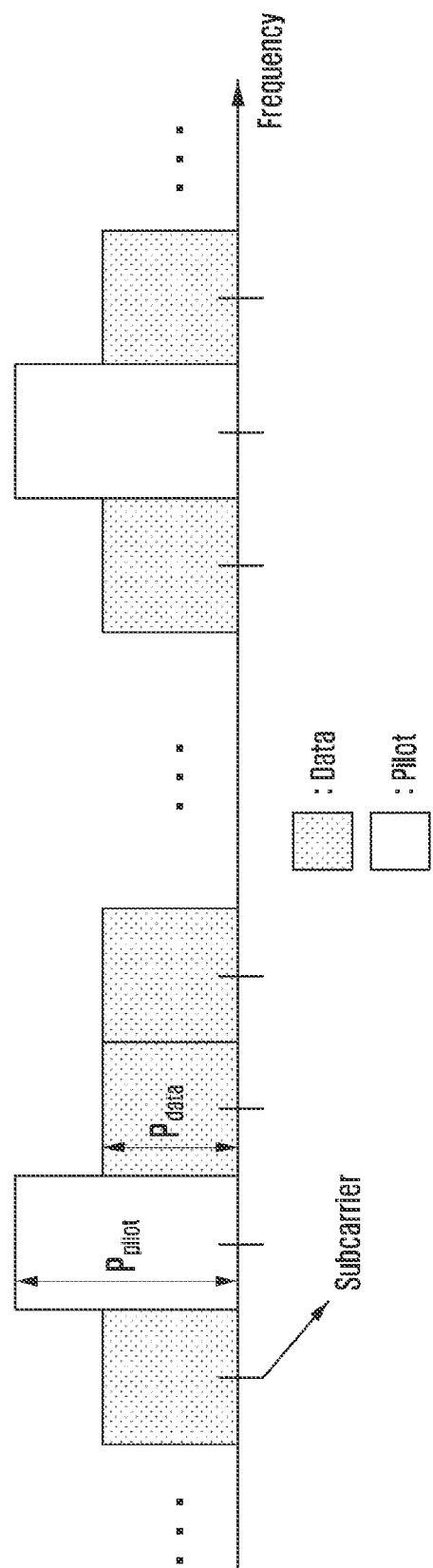
FIG. 1 is a diagram illustrating a configuration of transmit powers of the pilot and data signals according to the related art.
Figure 2:
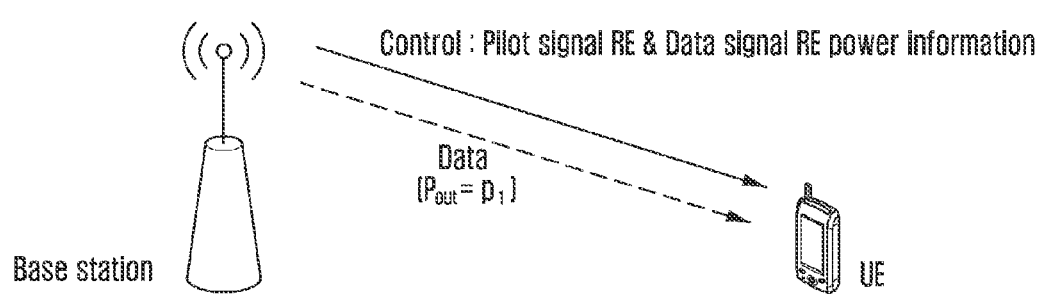
FIG. 2 is a diagram illustrating the power ratio information transmission of the base station according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some of elements are exaggerated, omitted or simplified in the drawings and the elements may have sizes and/or shapes different from those shown in drawings, in practice. The same reference numbers are used throughout the drawings to refer to the same or like parts.

In the following description, the term 'dominant interference cell' denotes the cell causing the greatest interference to a certain User Equipment (UE). In the case that the interference is caused by neighbor cells, there might be no dominant interference cell, or two or more dominant interference cells. Unless otherwise stated, the dominant interference cell denotes one cell causing the greatest interference to the corresponding terminal herein.

The term 'dominant inter-cell interference signal' denotes the interference signal caused by the dominant interference cell.

According to an embodiment of the present disclosure, the receiver of the terminal may use the dominant inter-cell interference signal for signal detection. In the current Long Term Evolution (LTE) system, the base station does not provide the UE with the information on the interference cell. In this case, the UE must know the channel estimation value of the dominant inter-cell interference signal and the power ratio of the dominant inter-cell interference signal. According to an embodiment of the present disclosure, the UE may acquire the power ratio information on the dominant inter-cell interference signal without requiring the assistance of the base station. Here, the power ratio information may include $\rho_A$, $\rho_B$, and other similar power ratio information.

According to an embodiment of the present disclosure, the UE may detect the signal based the dominant inter-cell interference signal using a receiver without requiring the assistance of a base station. An embodiment of the present disclosure provides a method for estimating power offset information of the interference signal necessary when using the dominant inter-cell interference signal for the user to detect the signal.

In order to improve the performance at a cell edge, the UE may use a receiver capable of handling the dominant inter-cell interference signal. At this time, the UE needs the power offset information of the dominant inter-cell interference signal with the serving cell. However, the UE cannot receive the power offset information of the dominant inter-cell interference signal.

Figure 3:
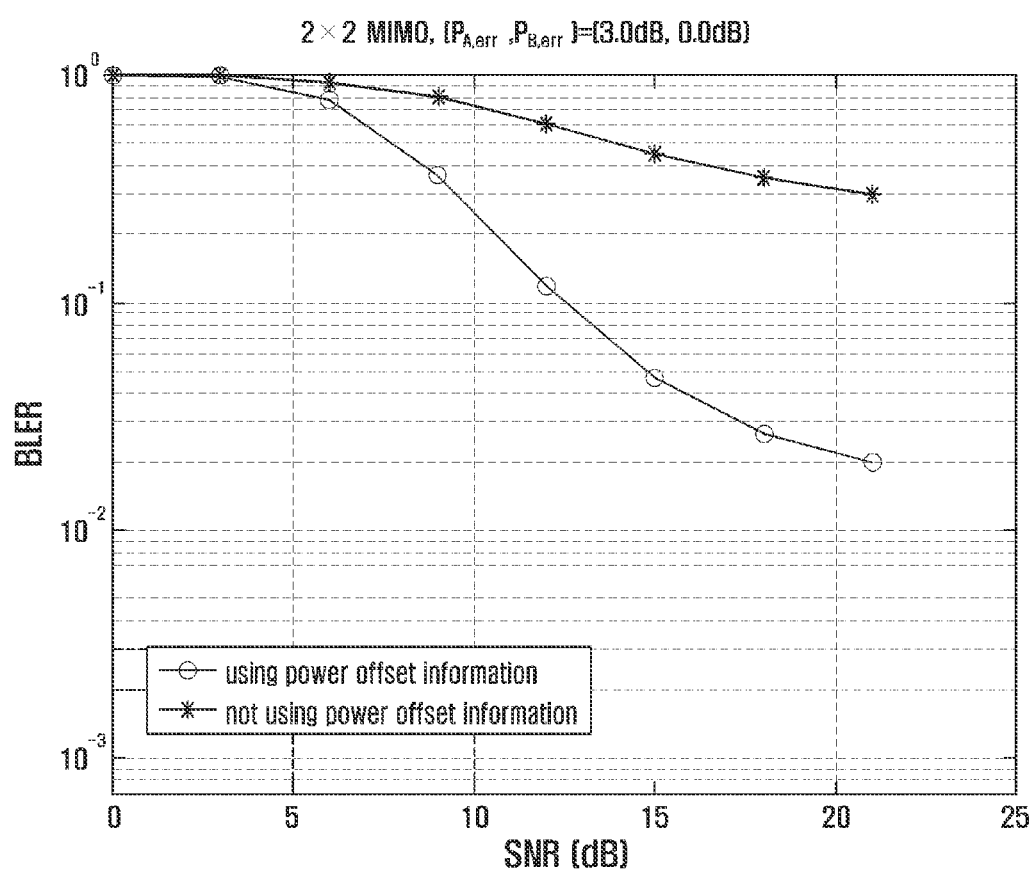
FIG. 3 is a graph illustrating the performance simulation result of the joint detection according to an embodiment of the present disclosure.

FIG. 3 is a graph illustrating performance simulation results of the joint detection according to an embodiment of the present disclosure.

Referring to FIG. 3, the receiver performs joint detection on the serving signal. When the receiver does not use the power offset information of the interference signal, the UE performance drops significantly compared to the case of using the power offset information of the interference information.

The receiver of the UE may perform correct detection when it knows the relationship between the transmit power of the pilot signal transmitted for channel estimation and of the data signal addressed to itself. The receiver handling the dominant inter-cell interference signal is capable of processing the interference signal correctly when it has the power offset information of the interference signal. However, the base station does not provide such information.

In order to solve this problem, an embodiment of the present disclosure proposes a method for estimating the power offset information of the dominant inter-cell interference signal for use by the receiver.

The conventional technology of the related art has at least the following problems.

a. In the typical Orthogonal Frequency Division Multiple Access (OFDMA) system including the $3^{rd}$ Generation Partnership Project Long Term Evolution (3GPP LTE) system, since only the transmit power ratio between the data signal and pilot signal is informed to the corresponding terminal, there may be a problem for use of the receiver requiring inter-cell interference information.

b. Since it is impossible to perform the joint detection of interference signal without power offset information, the power offset estimation must work in a state without known information on the interference signal. Here, the known information may include one or more of a transmission mode of the interference signal, a precoding matrix indicator, a number of layers, a modulation order, etc.

In order to support the operations of the receiver such as joint detection and interference cancellation using the dominant inter-cell interference, the UE estimates the power offset information of the interference signal to obtain the performance gain of the receiver.

Figure 4:
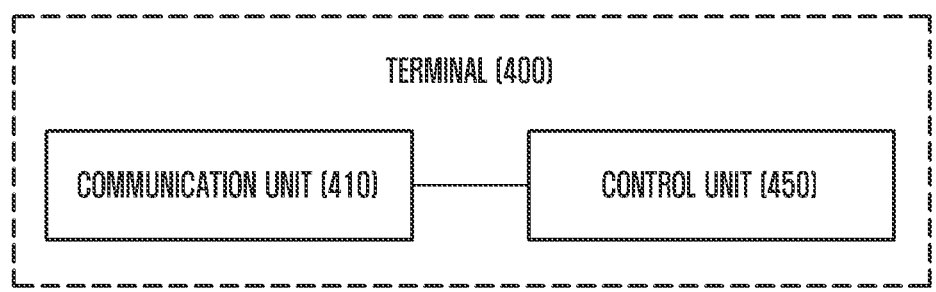
FIG. 4 is a block diagram illustrating a configuration of the terminal according to an embodiment of the present disclosure.

FIG. 4 is a block diagram illustrating a configuration of the terminal according to an embodiment of the present disclosure.

Referring to FIG. 4, the terminal 400 includes a communication unit 410 and a control unit 450. The communication unit 410 is responsible for signal transmission/reception and signal measurement according to various embodiments of the present disclosure. The control unit 450 controls the components of the terminal 100 to operate as embodied in the various embodiments of the present disclosure and performs necessary operations. Descriptions are made of the detailed operations of the communication unit 410 and the control unit 450 with reference to FIGS. 5, 6, and 7.

Figure 5:
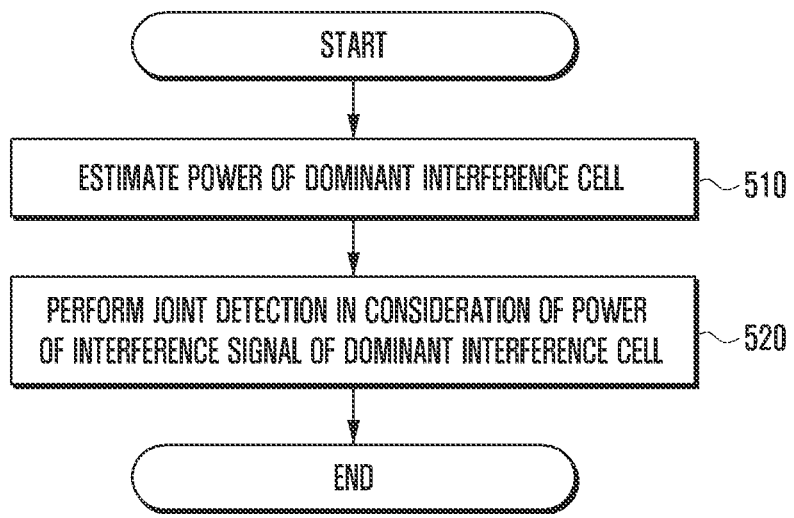
FIG. 5 is a flowchart illustrating a signal detection method according to an embodiment of the present disclosure.

FIG. 5 is a flowchart illustrating a signal detection method according to an embodiment of the present disclosure.

The control unit 450 estimates the transmit power of the dominant interference cell at operation 510. The detailed process of the power information estimation is described below with reference to FIGS. 6 and 7. The power information on the dominant interference cell may include the power ratios $\rho_A$ and $\rho_B$ of the dominant interference cell, as defined above.

The control unit 450 performs joint detection on the signal using the power information on the dominant interference cell at operation 520. The control unit 450 performs signal detection by reducing the measurement performance degradation of the interference signal of the dominant interference cell, i.e., the dominant inter-cell interference signal.

Typically, the OFDMA system of the related art uses a reference signal for channel estimation. Such a reference signal is arranged in a Resource Block (RB) along with the data signal. There is a tradeoff relationship between reference signal overhead and the data transmission resource such that the data transmission resource decreases as the reference signal overhead increases. Accordingly, the reference signal is arranged with low density in the time-frequency resource grid. According to the LTE standard, two types of OFDM symbols are included in a subframe of 1 millisecond length. One of the two types of OFDM symbols is the OFDM symbol having both the Cell-specific Reference Signal (CRS) and data signal, and the other is the OFDM symbol having only the data signal. The power ratio between the data signal and CRS is defined with $\rho_A$ and $\rho_B$.

Figure 6:
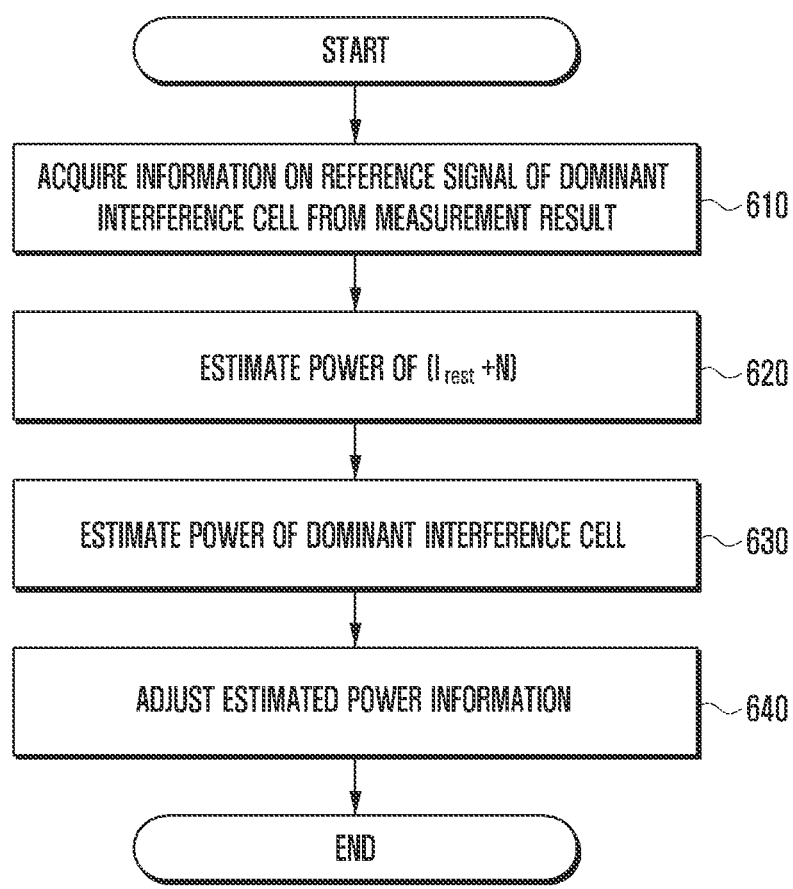
FIG. 6 is a flowchart illustrating a signal detection method according to another embodiment of the present disclosure.

FIG. 6 is a flowchart illustrating a signal detection method according to another embodiment of the present disclosure.

Referring to FIG. 6, in the following embodiment, both the $\rho_A$ and $\rho_B$ of the dominant inter-cell interference signal are estimated. The order of estimating $\rho_A$ and $\rho_B$ may be changed. As described above, the ratio between the transmit power at the Physical Downlink Shared Channel (PDSCH) RE and the transmit power at the Cell-specific Reference Signal (CRS) RE in the OFDM symbol carrying no CRS is defined as $\rho_A$. Likewise, the ratio between the transmit power at the PDSCH RE and the transmit power at the CRS (i.e., a pilot signal) RE in the OFDM symbol carrying CRS is defined as $\rho_B$.

The terminal 400 acquires the information on the reference signal of the dominant interference cell at operation 610. The communication unit 410 of the terminal 400 may measure neighbor cell signals. The control unit 450 of the terminal 400 may acquire the information on the reference signal of the dominant interference cell using the measurement result. The description is directed to the case of using CRS as the reference signal. The control unit 450 acquires the cell identifier of the dominant interference cell and other the information necessary for checking CRS of the dominant interference cell using the measurement result. The control unit 450 may check the information on the CRS of the dominant interference cell based on such information. Typically, if the cell identifier is determined, the CRS is determined and thus it is possible to acquire the cell identifier of the dominant interference cell and apply the method using the cell identifier.

The control unit 450 estimates the power of rest interference ($I_{rest}$) and noise (N) with the exception of the dominant inter-cell interference, i.e., the power of ($I_{rest}$+N), at operation 620. The control unit 450 removes the interference reference signal from the subcarrier carrying the reference signal of the interference cell. The power of ($I_{rest}$+N) may be estimated with various methods as well as the above described method.

The control unit 450 estimates the power information of the dominant interference cell at operation 630. For example, the control unit 450 removes the serving cell interference signal from the subcarrier carrying the serving cell reference signal for estimating $\rho_B$ of the dominant interference cell. The control unit 450 estimates $\rho_B$ of the dominant interference cell after removing the influence of the interference Multiple Input, Multiple Output (MIMO) channel matrix. The control unit 450 also estimates $\rho_A$ of the dominant interference cell after removing the Interference MIMO channel matrix on data subcarrier of the OFDM symbol carrying no CRS.

If the estimated dominant interference cell's power information is out of the valid range, the control unit 450 may adjust the power information to a valid value at operation 640.

Figure 7:
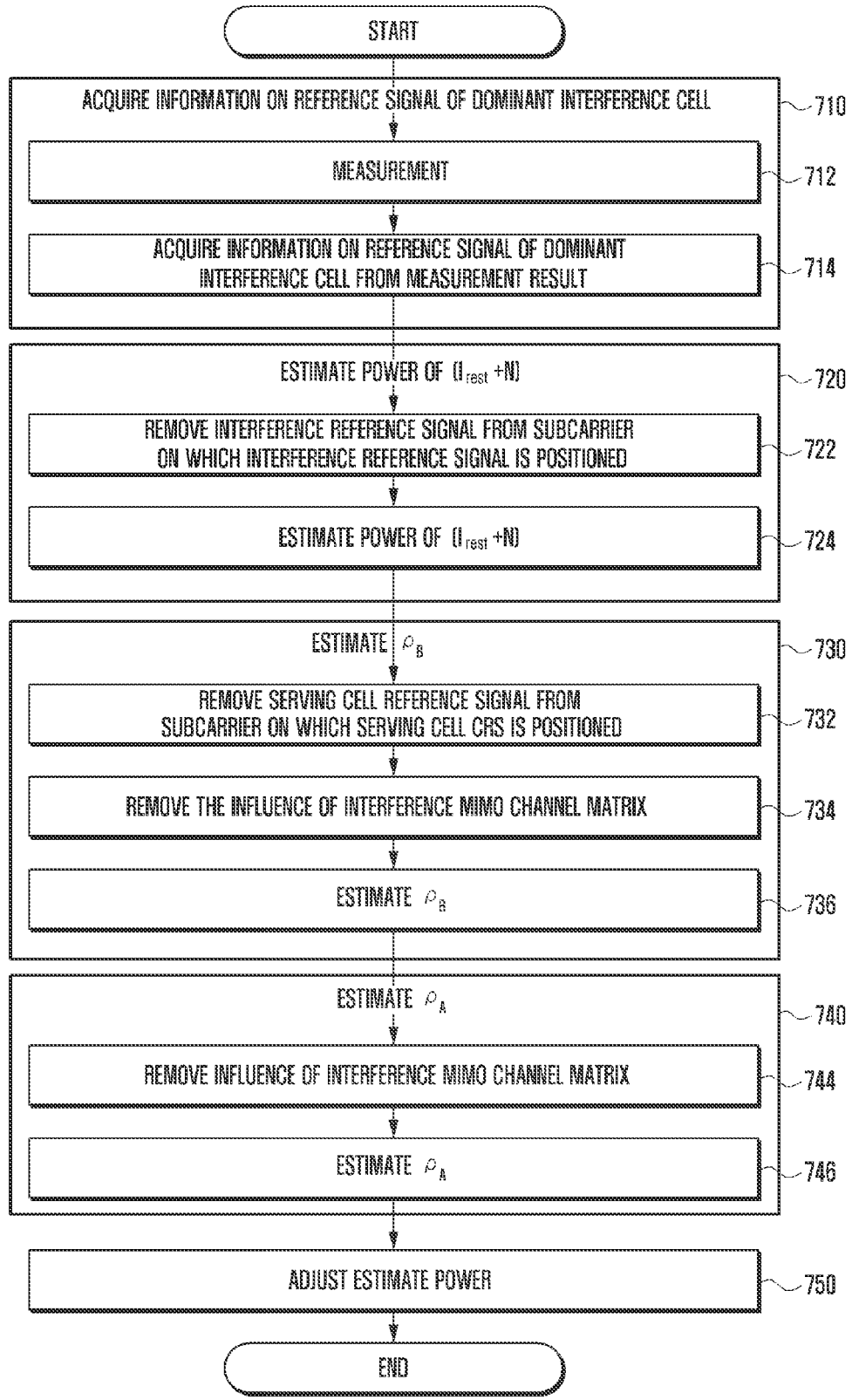
FIG. 7 is a flowchart illustrating a dominant interference cell power information estimation procedure of the signal detection method according to an embodiment of the disclosure.

FIG. 7 is a flowchart illustrating a dominant interference cell power information estimation procedure of the signal detection method according to an embodiment of the present disclosure. The flowchart of FIG. 7 shows details of the flowchart of FIG. 6. The embodiment of FIG. 7 is directed to a 3GPP LTE system, but the present disclosure is not limited thereto.

Referring to FIG. 7, according to the LTE standard, the power information ($\rho_A$ and $\rho_B$) of the dominant inter-cell interference signal may vary in every RB. Accordingly, it may be necessary to perform estimation in units of an RB.

The terminal 400 acquires the information on the reference signal of the dominant interference cell at operation 710. Operation 710 includes operations 712 and 714.

The communication unit 410 of the terminal 400 performs measurement at operation 712. The communication unit 410 of the terminal 400 may measure neighbor cell signals.

The control unit 450 of the terminal 400 may acquire the information on CRS of the dominant interference cell using the measurement result at operation 714. For example, the control unit 450 may determine the cell causing the greatest interference as the dominant interference cell based on the measurement result. The control unit 450 acquires the cell identifier of the dominant interference cell and other information necessary for checking CRS of the dominant interference cell. The control unit 450 may check the information on the position of CRS of the dominant interference cell on the frequency-time resource grid and other information related to the corresponding CRS using the above information. Typically, if the cell identifier is determined, the CRS is determined as a consequence and thus it is possible to acquire the cell identifier of the dominant interference cell and apply the method using the cell identifier.

Operations 720 to 750 may be performed per RB.

The control unit estimates the power of the rest interference ($I_{rest}$) and noise (N) with the exception of the dominant inter-cell interference, i.e., the power of ($I_{rest}$+N), at operation 720.

The control unit 450 removes the interference reference signal from the subcarrier on which the reference signal of the interference cell is positioned at operation 722. Equation (1) indicates the reception signal $Y(k_1)$ at the Resource Element (RE) to which the dominant inter-cell interference CRS is mapped in the RB. In Equation (1), $k_1 \in K_{ic}$ denotes the RE index. $K_{ic}$ denotes a set of RE indices. The size of $K_{ic}$ is 12 per RB. Since the three OFDM symbols with the exception of the first OFDM symbol for PDCCH among the four OFDM symbols carrying CRS in an RB include four CRS REs respectively, the size of the RE index set is 12.

$$Y(k_1)=H_{eq,d}(k_1)x_d(k_1)+H_i(k_1)s_i(k_1)+N(k_1) \quad \text{Equation (1)}$$

Here, $H_{eq,d}(k_1)$ denotes an equivalent channel matrix of the desired serving signal in consideration of precoding, $x_d(k_1)$ denotes the desired data symbol, $H_i(k_1)$ denotes the interference channel matrix, $s_i(k_1)$ denotes the interference CRS symbol at the RE, and $N(k_1)$ denotes $(I_{rest}+N)$ vector.

The control unit 450 may acquire the interference CRS component-removed signal $Z(k_1)$ using Equation (2).

$$Z(k_1) = Y(k_1) - \hat{H}_i(k_1)s_i(k_1) \quad \text{Equation (2)}$$
$$= H_{eq,d}(k_1)x_d(k_1) + N(k_1)$$

Afterward, the control unit 450 estimates the power of the rest interference (Irest) and Noise (N) with the exception of the dominant inter-cell interference, i.e., the power of $(I_{rest}+N)$, using the information on the service cell signal at operation 724. The control unit 450 may estimate the power of $(I_{rest}+N)$ using Equation (3).

$$\begin{bmatrix} \sigma_{n1}^2 \\ \sigma_{n2}^2 \end{bmatrix} = \frac{1}{12} \sum_{k_1 \in \mathcal{K}_{ic}} |Z(k_1) - \hat{H}_{eq,d}(k_1)\hat{x}_d(k_1)|^2, \quad \text{Equation (3)}$$

$$\text{where } \hat{x}_d(k_1) = \underset{x_d \in C_d^2}{\text{argmin}} |Z(k_1) - \hat{H}_{eq,d}(k_1)x_d|^2$$

The control unit 450 estimates $\rho_B$ of the dominant interference cell at operation 730. Operation 730 includes operations 732, 734, and 736.

The control unit 450 removes the serving cell reference signal from the subcarrier on which the serving cell CRS is positioned at operation 732. Equation (4) shows the reception signal $Y(K_2)$ at the RE to which the serving CRS is mapped in the RB. Here, $k_2 \in K_{sc}$ denotes the RE index. The size of the RE index set $K_{sc}$ is 12 per RB.

$$Y(k_2)=H_d(k_2)s_d(k_2)+\rho_B H_i(k_2)W_i(k_2)x_i(k_2)+N(k_2) \quad \text{Equation (4)}$$

In Equation (4), $s_d(k_2)$ denotes a serving CRS symbol and $W_i(k_2)$ denotes the interference precoding matrix.

The control unit 450 may acquire the serving CRS component-removed signal $Z(K_2)$ from $Y(K_2)$ using Equation (5).

$$Z(k_2) = Y(k_2) - \hat{H}_d(k_2)s_d(k) \quad \text{Equation (5)}$$
$$= \rho_B H_i(k_2)W_i(k_2)x_i(k_2) + N(k_2)$$

The control unit removes the influence of the Interference MIMO channel matrix from the serving CRS component-removed signal at operation 734. The control unit 450 does not retain the information on the precoding matrix of the interference cell. Accordingly, in order to remove the influence of the precoding matrix of the interference cell, the control unit 450 multiplies $G(K_2)$ by $Z(K_2)$. Equation (6) shows $G(K_2)$.

$$G(k_2)=(\hat{H}_i(k_2)^H \hat{H}_i(k_2))^{-1}\hat{H}_i(k_2)^H \quad \text{Equation (6)}$$

Equation (7) shows the signal after removing the influence of the precoding matrix of the interference cell by multiplying $G(K_2)$ by $Z(K_2)$.

$$G(k_2)Z(k_2)=\rho_B W_i(k_2)x_i(k_2)+G(k_2)N(k_2) \quad \text{Equation (7)}$$

The control unit 450 estimates $\rho_B$ of the dominant interference cell at operation 736.

The control unit 450 may estimate $\rho_B$ using the following Algorithm 1.

---
Algorithm 1
---
AvgVal = 0;
ValidSampleNum = 0;
FOR $k_2 \in K_{sc}$
   TempVal = $||G(k_2)Z(k_2)||^2 - ((G_{00}^2 + G_{10}^2)\sigma_{n1}^2 + (G_{01}^2 + G_{11}^2)\sigma_{n2}^2)$
   IF (TempVal > 0)
     AvgVal = AvgVal + TempVal
     ValidSampleNum++
   END_IF
END_FOR
$\hat{\rho}_B$ = AvgVal / ValidSampleNum

---

Here, $G_{ij}$ denotes the element at $i^{th}$ row and $j^{th}$ column of $G(k_2)$.

The control unit 450 estimates $\rho_A$ of the dominant interference cell at operation 740. Operation 740 includes operations 744 and 746.

The control unit removes the influence of the interference MIMO channel matrix (precoding matrix of interference cell) from the reception signal at the data RE of the OFDM symbol carrying no CRS at operation 744.

Equation (8) shows the reception signal $Y(k_3)$ at the data RE of the OFDM symbol not carrying CRS (non-CRS OFDM symbol).

$$Y(k_3)=H_{eq,d}(k_3)x_d(k_3)+\rho_A H_i(k_3)W_i(k_3)x_i(k_3)+N(k_3) \quad \text{Equation (8)}$$

The control unit 450 does not retain the information on the precoding matrix of the interference cell. Accordingly, in order to remove the influence of the precoding matrix of the interference cell, the control unit 450 multiplies $G(K_3)$ by $Z(K_3)$. Equation (9) shows $G(K_3)$.

$$G(k_3)=(\hat{H}_i(k_3)^H \hat{H}_i(k_3))^{-1}\hat{H}_i(k_3)^H \quad \text{Equation (9)}$$

The control unit 450 estimates $\rho_A$ of the dominant interference cell at operation 746.

The control unit 450 may estimate $\rho_A$ using Algorithm 2.

$$\hat{\rho}_A = \quad \text{Algorithm 2}$$

$$\frac{1}{|\mathcal{K}_d|} \sum_{k_3 \in \mathcal{K}_d} (||G(k_3)Y(k_3)||^2 - \text{trace}(F(k_3)F^H(k_3)) - V(k_3))$$

where $F(k_3)=G(k_3)H_{eq,d}(k_3)$, $$V(k_3)=((G_{00}^2+G_{10}^2)\sigma_{n1}^2+(G_{01}^2+G_{11}^2)\sigma_{n2}^2),$$

$G_{ij}$ is the $i_{th}$ row and the $j_{th}$ column dement of $G(k_3)$

If the estimated power information of the dominant interference cell is out of the valid range, the control unit 450 may adjust the power information to a valid value at operation 750.

The maximum and minimum values of $\rho_A$ and $\rho_B/\rho_A$ are as follows.

$$\min(\rho_A) \doteq 0.25(-6 \text{ dB}), \min(\rho_B/\rho_A)=1/2(-3 \text{ dB})$$

$$\max(\rho_A)=2(3 \text{ dB}), \max(\rho_B/\rho_A)=5/4(0.97 \text{ dB})$$

The control unit 450 may adjust $\rho_A$ and $\rho_A$ to be in the range of the minimum and maximum values range using Algorithm 3.

---
Algorithm 3
---

```
IF (ρ̂_B < min(ρ_B/ρ_A) × min(ρ_A))
    ρ̂_B = min(ρ_B/ρ_A) × min(ρ_A)
    ρ̂_A = min(ρ_A)
ELSEIF (ρ̂_B > max(ρ_B/ρ_A) × max(ρ_A))
    ρ̂_B = max(ρ_B/ρ_A) × max(ρ_A)
    ρ̂_A = max(ρ_A)
ELSE
    IF (ρ̂_A < min(ρ_A))
        ρ̂_A = min(ρ_A)
    ELSEIF (ρ̂_A > max(ρ_A))
        ρ̂_A = max (ρ_A)
    END_IF
END_IF
```

Algorithm 3 may be summarized as follows.
a. If $\rho_B$ is less than the multiplication (min ($\rho_B$)) of min($\rho_A$) and min($\rho_B/\rho_A$), set $\rho_B$ to multiplication (min ($\rho_B$)) of min($\rho_A$) and min($\rho_B/\rho_A$) and $\rho_A$ to min($\rho_A$).
b. If is greater than the multiplication (min ($\rho_B$)) of min($\rho_A$) and min($\rho_B/\rho_A$), set $\rho_B$ to multiplication of max($\rho_A$) and max($\rho_B/\rho_A$) and $\rho_A$ to max($\rho_A$).
c. If $\rho_A$ is less than min($\rho_A$), set $\rho_A$ to min($\rho_A$).
d. If $\rho_A$ is greater than min($\rho_A$), set $\rho_A$ to max($\rho_A$).

According to an embodiment of the present disclosure, the receiver acquires the power offset information of the dominant inter-cell interference which enables the receiver to handle the interference. As a consequence, it is possible to improve the terminal performance at the cell edge.

According to an embodiment of the present disclosure, the receiver estimates the power of the rest interference and noise signal, with the exception of the dominant inter-cell interference, to execute the interference handling algorithm.

According to an embodiment of the present disclosure, the terminal uses the reference signal of the serving cell as a known signal in estimating the power offset of the dominant inter-cell interference so as to improve the estimation performance.

According to an embodiment of the present disclosure, the terminal estimates the power of the rest interference and noise components separately, with the exception of the serving cell signal and the dominant inter-cell interference signal.

According to an embodiment of the present disclosure, the terminal removes the dominant inter-cell interference channel component when estimating power and performs a layer sum to remove the unknown precoding elements.

As described above, the signal detection method and apparatus of the present disclosure is capable of improving signal detection performance.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to configure a machine, such that the instructions, which execute via the processor of the computer or other programmable data processing apparatus, create means for implementing the functions/acts specified in the disclosure. These computer program instructions may also be stored in a nonvolatile computer-readable memory that can direct a computer or other programmable data processing apparatus to function in a particular manner, such that the instructions stored in the computer-readable memory produce an article of manufacture including instruction means which implement the function/act specified in the disclosure. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the disclosure.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order, according to their functions.

The term "module" according to the various embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) or processors in a device or a secure multimedia card.

The foregoing disclosure has been set forth merely to illustrate the disclosure and is not intended to be limiting. Since modifications of the disclosed various embodiments incorporating the spirit and substance of the disclosure may occur to persons skilled in the art, the disclosure should be construed to include everything within the scope of the appended claims and equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A signal detection method comprising:
  acquiring information on a reference signal of a dominant interference cell causing dominant interference to a serving cell;
  estimating power of a rest interference ($I_{rest}$) and a noise N ($I_{rest}$+N) based on the information on the reference signal of the dominant interference cell, wherein the rest interference and noise ($I_{rest}$+N) comprises a received signal excepting the dominant interference of the dominant interference cell;

estimating a power ratio of data and pilot signals of the dominant interference cell using the power of the $I_{rest}$+N; and detecting a signal of the serving cell using the estimated power ratio of the dominant interference cell.

2. The method of claim 1, wherein the information on the reference signal of the dominant interference cell is acquired based on a measurement for neighbor cell signals.

3. The method of claim 1, wherein the estimating of the power ratio of the dominant interference cell using the power of $I_{rest}$+N comprises:

acquiring a first modification signal by removing a serving cell reference signal from a subcarrier on which the serving cell reference signal is positioned using the power of $I_{rest}$+N;

acquiring a second modification signal by removing an influence of a precoding matrix of interference cell from the first modification signal; and acquiring a ratio $\rho_B$ between a transmit power of a data signal Resource Element (RE) and a reference signal RE of the dominant interference cell in an Orthogonal Frequency Division Multiplexing (OFDM) symbol carrying the reference signal of the dominant interference cell from the second modification signal.

4. The method of claim 3, wherein the estimating of the power ratio of the dominant interference cell using the power of $I_{rest}$+N further comprises:

acquiring a third modification signal by removing the influence of the precoding matrix of the interference cell from a reception signal at a data signal RE to which no serving cell reference signal is mapped using the power of $I_{rest}$+N; and acquiring a ratio $\rho_A$ between the transmit power at the data signal RE and the transmit power at the reference signal RE of the dominant interference cell in the OFDM symbol carrying no reference signal of the dominant interference cell from the third modification signal.

5. The method of claim 4, further comprising adjusting, if the estimated $\rho_A$ or estimated $\rho_B$ is outside of a valid range, at least one of $\rho_A$ and $\rho_B$ to be a value within the valid range.

6. The method of claim 2, wherein a Cell-specific Reference Signal (CRS) is used as the reference signal of the dominant interference cell.

7. The method of claim 6, wherein a cell identifier of the dominant interference cell is determined based on the measurement, and wherein the CRS is checked based on the cell identifier.

8. The method of claim 1, wherein the estimating of the power ratio of the dominant interference cell comprises removing an influence of an interference Multiple Input, Multiple Output (MIMO) channel matrix.

9. A signal detection apparatus comprising:

a communication unit comprising a transmitter for signal transmission and a receiver for signal reception; and a control unit configured to:

acquire information on a reference signal of a dominant interference cell causing dominant interference to a serving cell, estimate power of a rest interference ($I_{rest}$) and a noise N ($I_{rest}$+N) based on the information on the reference signal of the dominant interference cell, wherein the rest interference and noise ($I_{rest}$+N) comprises a received signal excepting the dominant interference of the dominant interference cell;

estimate a power ratio of data and pilot signals of the dominant interference cell using the power of the $I_{rest}$+N, and detect a signal of the serving cell using the estimated power ratio of the dominant interference cell.

10. The apparatus of claim 9, wherein the information on the reference signal of the dominant interference cell is acquired based on a measurement for neighbor cell signals.

11. The apparatus of claim 9, wherein the control unit is further configured to:

acquire a first modification signal by removing a serving cell reference signal from a subcarrier on which the serving cell reference signal is positioned using the power of $I_{rest}$+N, acquire a second modification signal by removing an influence of a precoding matrix of interference cell from the first modification signal, and acquire a ratio $\rho_B$ between a transmit power of a data signal Resource Element (RE) and a reference signal RE of the dominant interference cell in an Orthogonal Frequency Division Multiplexing (OFDM) symbol carrying the reference signal of the dominant interference cell from the second modification signal.

12. The apparatus of claim 11, wherein the control unit is further configured to:

acquire a third modification signal by removing the influence of the precoding matrix of the interference cell from a reception signal at a data signal RE to which no serving cell reference signal is mapped using the power of $I_{rest}$+N, and acquire a ratio $\rho_A$ between the transmit power at the data signal RE and the transmit power at the reference signal RE of the dominant interference cell in the OFDM symbol carrying no reference signal of the dominant interference cell from the third modification signal.

13. The apparatus of claim 12, wherein the control unit adjusts, if the estimated $\rho_A$ or estimated $\rho_B$ is outside of a valid range, at least one of $\rho_A$ and $\rho_B$ to be a value within the valid range.

14. The apparatus of claim 10, wherein a Cell-specific Reference Signal (CRS) is used as the reference signal of the dominant interference cell.

15. The apparatus of claim 14, wherein a cell identifier of the dominant interference cell is determined based on the measurement, and wherein the CRS is checked based on the cell identifier.

16. The apparatus of claim 9, wherein the estimating of the power ratio of the dominant interference cell comprises removing an influence of an interference Multiple Input, Multiple Output (MIMO) channel matrix.

* * * * *